March 10, 1964     D. J. MYNALL     3,124,676
BINARY DIGITAL MULTIPLIER AND ADDER ARRANGEMENT
Filed Oct. 21, 1960     2 Sheets-Sheet 1
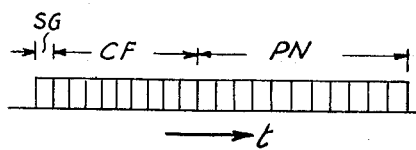
*Fig. 1.*
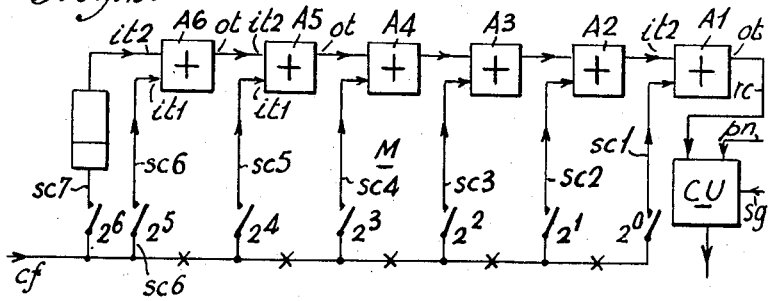
*Fig. 2.*
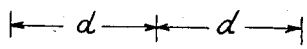
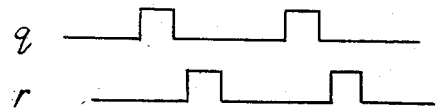
*Fig. 3.*
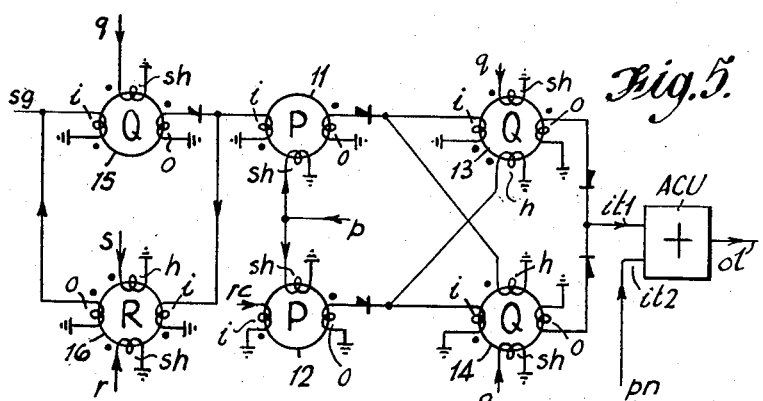
*Fig. 5.*
INVENTOR
DENNIS JAMES MYNALL
ATTORNEY

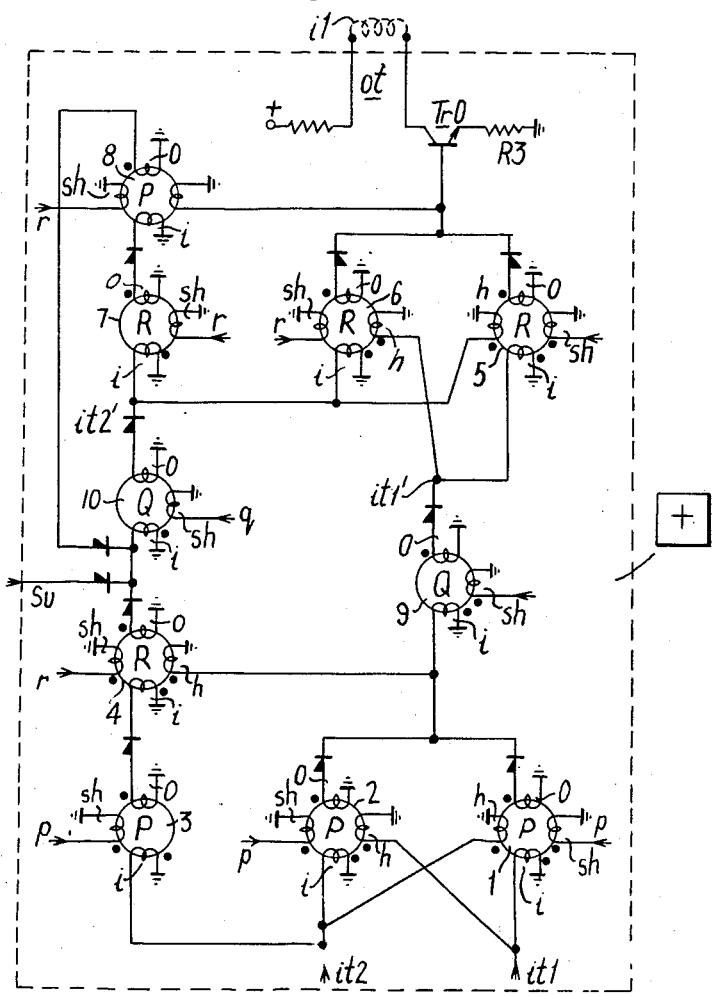

United States Patent Office 3,124,676
Patented Mar. 10, 1964

3,124,676
BINARY DIGITAL MULTIPLIER AND ADDER ARRANGEMENT
Dennis James Mynall, Rugby, England, assignor to Associated Electrical Industries Limited, London, England, a British company
Filed Oct. 21, 1960, Ser. No. 63,997
Claims priority, application Great Britain Oct. 23, 1959
4 Claims. (Cl. 235—164)

This invention relates to digital computing arrangements.

It is sometimes required that a digital number recorded in binary form on a magnetic tape or other recording medium and read from it for utilisation, requires to have applied to it, prior to such utilisation, a correction which is the product of a fixed numerical quantity, the value of which may be preselectable, and a variable numerical quantity: for instance, the correction may be a variable fraction of a given maximum magnitude represented numerically.

To give an example of a situation in which such a requirement may arise, there may be considered an automatic machining system in which control of the relative positions of a tool with respect to a workpiece along two or three directions of relative movement is continuously and contemporaneously exercised in accordance with recorded positional programmes appropriate to the tool forming a required contour or profile on the workpiece. The positional programmes may comprise, in respect of each direction of relative movement, a succession of recorded digital numbers which represent on a given scale, with reference to some arbitrary zero position, a succession of instantaneous positions closely spaced along the relevant direction by an amount not greater than some small maximum value, for instance not greater than about one hundredth of an inch, in order to give good resolution and accuracy. These digital numbers are continuously and successively read from the recording medium, and a servo-mechanism, which is fed also with information as to the actual instantaneous positions of the tool relative to the workpiece along the direction concerned, acts so as always to adjust the actual position towards the next required position called for by the programme.

As is known, the radius of the forming tool must be taken into consideration in such systems and is likely to vary from tool to tool, or even in the same tool on re-grinding. To this end, recorded programmes may be determined in accordance with a required profile or contour without allowance for tool radius, and a correction, which is determined according to the radius of the tool being used, may be applied to the positional information as read from the programme. Alternatively and, for the sake of closer accuracy, preferably, the recorded programmes may be determined in accordance with the required relative movement, with respect to the workpiece, of the centre of a tool of nominal radius, a correction dependent on the difference, if any, between the nominal tool diameter and the actual diameter of the tool being used, being applied to the positional information as read from the recording medium. In either case, as is well known, the correction has to be made, in effect, in a direction normal to the surface of the workpiece at the point of contact between it and the tool. Accordingly for each direction of controlled relative movement other than any such direction which is parallel to the tool axis (the motions along the several directions being in fact compounded into a single resultant motion that is instantaneously parallel or tangential to the required workpiece surface), a positional correction is required which is a variable fraction of the tool diameter or diameter difference as the case may be, this latter quantity being constant for a given tool being used and the variable fraction being a function of the instantaneous angle between the direction concerned and that of the resultant motion. Assuming the directions of the controlled relative movements are mutually perpendicular, this variable fraction is variable between unity when the resultant motion is perpendicular to the direction concerned, that is, when there is no component of movement along it, and zero when the resultant motion is parallel to that direction, there being no component of movement along the other direction.

It is an object of the present invention to provide a relatively simple computing arrangement which can be used in the above circumstances and which in general can provide, from a recorded binary digital number, a digital output representing that number modified in accordance with the product of a given numerical quantity and a variable modification factor an instantaneous value of which is recorded in binary form along with the digital number.

According to the invention the computing arrangement is arranged to receive the recorded digits of the modification factor and of the digital number as two successive digit groups in that order, the least significant digit in each group being first, and comprises first and second input leads to which are applied the serial digits of the modification factor and of the digital number respectively, a plurality of binary switching connections which can be respectively set according to the digit values of said numerical quantity in binary form, all of said connections except the one relating to the most significant binary digit of this quantity affording connection according to their settings between said first input lead and respective digital addition circuits, each acting with a delay of at least one digit period, a delay element to which the remaining switching connection affords connection from said first input lead and between which and a first output lead the addition circuits are connected in cascade, and a combining circuit arranged to receive serial digits from said second input lead and from the first output lead with time coincidence of digits of like significance, whereby to provide on a final output lead an algebraic addition of these digits representing the required modified value of the original digital number.

The required time coincidence of the digits applied to the combining circuit can be achieved by the provision, if necessary, of a further delay element or elements providing a delay of a requisite number of digit periods.

The arrangement has the advantage that the amount of additional delay which is required to be provided for this latter purpose can be relatively small, for instance of the order of only one or two digit periods at most, thereby eliminating the need for storing the recorded digits for any considerable time after they have been read from the recording medium.

The nature of the invention may be more fully understood from the following description of an embodiment thereof as it may be applied to a machine tool control system employing recorded positional programmes. In describing this embodiment reference will be made to the accompanying drawings in which:

FIG. 1 illustrates the time sequence of the digital data;

FIG. 2 is a diagram in logical form illustrating the invention;

FIG. 3 illustrates the relative timing of certain shift pulses required for the multiplier and combining unit, which are described as constituted by ferrite core circuits;

FIG. 4 is a circuit diagram of a ferrite core addition circuit; and

FIG. 5 is a circuit diagram illustrating a manner of processing the absolute correction according as the sign digit is a "0" or "1."

Let it be assumed that a milling machine is to be controlled in its relative movements along three mutually perpendicular directions X, Y, Z, one of which, say Z, is parallel to the axis of the milling cutter. On a programme tape is recorded for each of these directions a programme comprising a succession of binary numbers representing successive positions, relative to a workpiece, which the cutter is required to occupy along the relevant direction in order to produce a required shape.

The three programmes can be computed and recorded in known manner from a knowledge of the shape required, and it will be further assumed that they relate to the required relative movements of the centre of a cutter of given nominal radius. No correction for differing tool radius is required for the direction of movement (Z) parallel to the cutter axis, but for the other two directions, X and Y, a correction is required if the cutter radius differs from this nominal value. The correction required is the difference in radius resolved along these two directions X and Y as a function of the angle between one of these directions and the instantaneous cutting direction at the time of the correction, this latter direction being determined, of course, by the compounded relative movements along the X and Y directions. Thus for each of the X and Y directions a correction is required which is the radius difference multiplied by a correction factor which varies with the instantaneous cutting direction and may vary between zero, when the direction of cutting is perpendicular to the X or Y direction concerned, and unity when the cutting direction is parallel to that direction. This correction factor, and also the sense of the correction, can be computed directly from a knowledge of the instantaneous cutting direction required or, possible more easily, from information available at an intermediate stage in the computation of the positional numbers constituting the controlling programmes for the X and Y directions.

For the purposes of the invention the positional numbers constituting the controlling programmes for the X and Y directions are each immediately preceded on the recording tape by the appropriate correcting factor, which is also recorded as a binary number. The binary digits constituting each positional number and each correction number are in time order of increasing significance, that is, the least significant digit comes first.

This is illustrated in FIG. 1 for a single digital position number PN preceded by a digital correction factor CF which is itself preceded by a sign digit SG. In FIG. 1 each small rectangle represents a single digit period in each of which is recorded a "1" digit or a "0" digit according to the values of the binary digits of the position number and correction factor and to the sense in which the correction is required. In this latter connection it will be assumed that a "1" sign digit requires that the correction should be subtracted from the position number, whereas a "0" sign digit requires addition.

The sign digit and the binary digits of the correction number and the position number following it are read from the tape in the time order indicated by arrow $t$ and are presented serially to a computing arrangement which, in accordance with the invention, provides a corrected positional number which can then be used for controlling the movement of the milling machine along the relevant direction, for instance by being fed to a positional servomechanism as already described. If the digits are recorded serially as represented in FIG. 1, they can be presented directly to the computing arrangement. If they are recorded in some other mode, for instance in a combined serial/parallel mode as described in my copending application No. 64,077, now U.S. Patent No. 3,103,614, they would first have to be passed through some form of serialiser by which they would be presented serially to the computing arrangement of the invention in the time order shown in FIG. 1.

Referring to FIG. 2 the computing arrangement comprises a multiplier M and combining unit CU which can be set to effect digital addition or subtraction depending upon the value of a sign digit. A distributor (not shown) which receives the recorded digits serially, passes the sign digit to the combining unit CU over a lead $sg$, the digits of the correction number CF into the multiplier M over lead $cf$, and the digits of the following position number PN into the combining unit CU over lead $pn$, in that time order. The distributor may take any known form functioning for instance under the control of timing, or "clock" pulses, coinciding in time with the successive digit periods.

The multiplying unit M includes a plurality of switching connections $sc1$–$sc7$ which by the provision therein of appropriate switching means schematically represented by the contacts labeled $2^0$–$2^6$ can be selectively opened or closed manually to represent in binary notation the difference, if any between the nominal cutter radius for which the programmes were computed and the actual radius of a cutter being used. For instance, if the unit of length is taken to be 0.0001 inch (0.1 thousandth of an inch) throughout, seven such switching connections would enable a radius difference of up to 12.7 thousandths of an inch in steps of 0.1 thousandths to be set into the multiplier, although practical considerations may make it convenient to limit to some smaller amount the maximum radius difference catered for. In order to permit the manual switching to be readily effected on a decimal basis, there may be associated with the multiplier two multi-position, multi-bank digitising switches (not shown) which can be set on a decimal basis but control the switching connections on a binary basis. One of these switches, arranged to deal with the digits of leads ($2^0$) and next-to-least ($2^1$) significance in the radium difference as expressed in binary notation, could be a two-bank switch having four positions representing decimal settings of 0.0, 0.1, 0.2, 0.3 thousandths of an inch. This switch closes one or other or both of the two switching connections $sc1$ and $sc2$ according to the two-digit binary equivalent of this decimal setting. The other switch could then be a five-bank switch having twenty-four positions representing decimal settings of 0.0, 0.4, 0.8 and so on in steps of 0.4 thousandths of an inch up to 9.2 thousandths, this switch being effective to close a combination of the five other switching connections $sc2$–$sc7$ according to the five-digit binary equivalent of its decimal setting. The radius difference could then be set in as the sum of the decimal settings of the two switches, the maximum radius difference catered for being therefore 9.2+0.3=9.5 thousandths of an inch in unit steps of 0.1 thousandths (i.e. $2^0$=1 unit=0.1 thou.).

In the multiplier M of the switching connections $sc1$–$sc6$, that is, those except the one relating to the most significant digit of the digitised radius difference, connect the lead $cf$ to one input $it1$ of respective serial adders A1–A6 represented in FIG. 2 by rectangles containing a + sign. The remaining switching connection $sc7$ connects this same lead $cf$ to a delay element DL15 having a delay of "1" digit period. The serial adders A1–A6, which also have a delay of "1" digit period each, are connected in cascade, in reverse order of the significance of digits to which their respective switching connections relate, between the delay element DL15 and an output lead $rc$ leading to the combining unit CU from the output terminal $ot$ of the last adder A1.

The action of the multiplier M is that when pulses corresponding to "1" digits of the correction factor CF begin to arrive serially on lead $cf$, the least significant pulse arrives first and immediately offers to the serial adders A1–A6, through those of switching connections $sc1$–$sc7$ that are closed according to the magnitude of the radius difference, a parallel (that is, simultaneous) digital representation of this radius difference multiplied by least significant "1" digit of the correction number. This constitutes a first partial product. The one digit period delays provided by the delay element DL15 and each of the adders A6–A1 result in a conversion from parallel to serial representation, so that this first partial product begins to emerge from the last amplifier in serial form. The next "1" digit pulse on lead *cf* forms another partial product in the same way and is immediately added in parallel to the first partial product with the correct relative numerical significance, because the first partial product moved along the adders by the relevant number of digit periods before the second partial product is presented to the adders. Successive input pulses add their respective parallel products in the same way, and the result is that there emerges serially from the multiplier M, an output lead *rc*, the full length product of the serial digital input represented by the pulses on lead *cf* and the parallel input represented by the settings of the switching connections *sc*1–*sc*7.

In the combining unit CU the digital output obtained on lead *rc* is processed in dependence on the sign digit (as will be described) and then added to the digital position information appearing on lead *pn*. It is arranged that before being added to the positional information on lead *pn*, the digital output on lead *rc* (which represents the absolute correction to be made to the position number) is subjected to an effective delay sufficient to bring its digits into time coincidence with the digits of like significance in the position number. This delay may already be inherent in the processing of the digital information on lead *rc*, or additional delay circuits may be introduced as required. Should the processing in fact introduce a longer delay than is necessary, an appropriate delay could be imposed on the positional information on lead *pn*. To give a particular example, let it be assumed that the positional numbers are recorded to an accuracy of $\frac{1}{20,000}$ of an inch, that is $2^{-1}$ units where the unit of length ($2^0$) is 0.1 thousandths of an inch, and that a tool radius difference can be set in to an accuracy of one unit (0.1 thousandth). The correction information on lead *rc* then requires to be delayed by a single digit period, as can be demonstrated by considering a simple case in which the multiplier's switching connections *sc*1–*sc*7 are set to represent a radius difference of 0.1 thousandths of an inch and a correction factor of unity is read from the tape, thus requiring that the positional number which immediately follows the correcting number on the tape should be corrected by 0.1 thousandths of an inch. The correcting factor as serialised is constituted by a sequence of seven "0" digits followed by a single "1" digit in the most significant digit place, representing unity as previously stated. When the pulse corresponding to this single "1" digit appears on the input lead *cf* to the multiplier, it passes through the closed switching connection *sc*1 to the input *it*1 of the last adder A1 in the cascade connection, this switching connection *sc*1 being the only one which has been closed (corresponding to a radius difference of 0.1 thou.). There being no input to terminal *it*2 of adder A1, a pulse is passed to the multiplier output lead *rc* with a delay of one digit period imposed on it by this adder, and is subjected to a further delay of one digit period in the combining unit, making a total delay of two digit periods. It therefore coincides in time with the second digit of the positional number being presented on lead *pn*, it being recalled that the least significant digit of the serial position number immediately follows in time the most significant digit of the correcting factor (cf. FIG. 1). Since a digit in the second place of the positional number represents 0.1 thousandths of an inch and this is the correction which is required, it can be seen that the required coincidence of digit significance has been achieved.

The adders A1–A6 in the multiplier M may take any form suitable for performing the well-known required logical functions of such adders. In FIG. 4 there is illustrated a suitable form of adder employing ferrite cores, each of which, in accordance with the well-known principles of ferrite core circuitry, can be "set" to one stable condition of magnetic saturation or "reset" to another stable condition. As will appear, the adder of FIG. 4 requires for its operation three distinct trains of driving, or "shift," pulses by which the conditions of the ferrite cores can be transferred from one to the next through the adder. As illustrated in FIG. 3, these trains of shift pulses *p*, *q*, *r* are interlaced in time and the pulses therein are so timed that a sequence of one pulse from each train occurs within a single degit period (*d*). The pulse trains can be derived in any known manner under the control of clock pulses defining the digit periods as already mentioned. The trains of pulses *p*, *q*, *r* are individually applied to correspondingly lettered leads in the circuit of FIG. 4 and again in the circuit of FIG. 5.

Referring now to FIG. 4, the adder there illustrated comprises cores 1–10 each having an input winding *i*, an output winding *o*, and a shift or driving winding *sh*. A pulse applied to the input winding "sets" the core. If the core has thus been set, a pulse applied to the shift winding "resets" the core and produces a pulse in the output winding: if the core had not been set, the pulse applied to the shift winding would have had no effect. Certain of the cores also have an inhibiting winding *h* which acts in opposition to the input winding so that the core will be left unset if a pulse is applied to this winding at the same time as a pulse is applied to the input winding *i*. The adder of FIG. 4 consists of two "half-adders," one of which is constituted by cores 1, 2, 3 and 4 and the other of which is constituted by cores 5, 6, 7 and 8. The input terminals *it*1 and *it*2 to the adder constitute the input terminals to the first half-adder and points *it*1' and *it*2' are corresponding input points to the second half-adder. Considering the first half-adder as typical, it has to fulfill the following logical functions: for a pulse representing a "1" digit applied to terminal *it*1 or *it*2 (but not to both of them simultaneously) the half-adder has to produce an output "sum" pulse representing a "1" digit; for input pulses representing "1" digits appearing simultaneously at terminals *it*1 and *it*2 the half-adder has not to provide a "sum" pulse but has to provide a "carry" pulse. This "carry" pulse has to be propagated to the next order of digit significance, and the second half-adder (cores 5, 6, 7 and 8) serves for adding the propagated "carry" pulse to any "sum" pulse produced by the first half-adder in respect of this next order of digit significance. More particularly a pulse appearing at either terminal *it*1 or terminal *it*2 will set the core 1 or 2 by its input winding *i* and the next pulse to occur on the lead *p* from the central control circuit will reset this core by its winding *sh* and produce an output pulse in its winding *o*. This output pulse sets a core 9 which on the next pulse on lead *q* is reset to apply from its output winding *o* an input pulse to the input point *it*1' of the second half-adder. The core 9 is introduced solely as a buffer and amplifying stage. Assuming that there is no propagated carry pulse to be added to this "sum" pulse at terminal *it*1', this pulse will set core 5 which on the next pulse on lead *r* will produce an output pulse in its winding *o*. This pulse is passed to the output terminal *ot* of the adder via a buffer and amplifying stage which in this case is shown as comprising an *n-p-n* transistor *Tr*0 to the base of which the output pulse from core 5 is applied and in the emitter circuit of which is included a current stabilising resistor R3. The transistor *Tr*0 is normally nonconductive and is rendered conductive for the duration of the output pulse from core 5, producing a resulting pulse at the output *ot*: with the circuit as shown, this output pulse is a current pulse as is required for instance for feeding into a following ferrite core circuit, for which an input winding *i*' is shown dotted.

It will be seen that the total delay between the application of an input pulse to terminal *it*1 or *it*2 and the production of an output pulse at the terminal *ot* corresponds to a single digit period as defined by a single sequence of pulses on the leads *p*, *q* and *r*.

If input pulses appear simultaneously on input terminals

*it*1 and *it*2 the connection of inhibiting winding *h* of core 2 to terminal *it*1 and the corresponding connection of the inhibiting winding *h* of core 1 to terminal *it*2 prevents either of these cores from becoming set. Consequently on the next pulse on the lead *p* no output pulse is applied towards the core 9. In this circumstance however, a carry pulse has to be produced and this is achieved by the cores 3 and 4. The condition for a carry pulse is the absence of a "sum" pulse and the presence of two input pulses, only one of which need be inspected because if the other was not present the condition of no "sum" pulse would not obtain. A pulse appearing at terminal *it*2 is therefore connected to set the core 3, which on the next pulse appearing on lead *p* produces an output pulse which attempts to set the core 4. If an input pulse is present only at terminal *it*2 an output "sum" pulse would be obtained from core 2 at this time and this "sum" pulse, applied to the inhibiting winding *h* of core 4, prevents this core from becoming set. Hence on the next pulse on the lead *r*, which would have produced an output pulse from the core 4 if this core had been set, no output carry pulse from this core is obtained. If, on the other hand, input pulses had been applied to both of terminals *it*1 and *it*2, no "sum" pulse would have been applied to the inhibiting winding *h* of core 4 from cores 1 and 2. Consequently, this core 4 would be set by the pulse received from core 3 and on the next pulse from the lead *r* would produce an output carry pulse which sets a core 10. On the next pulse on lead *q*, which will occur in the next digit period, the core 10 then produces a propagated carry pulse which is applied to the input point *it*2' of the second half-adder. The second half-adder constituted by the cores 5, 6, 7 and 8 functions in an exactly similar manner depending on whether an input pulse appears at point *it*1' or *it*2' or at both of these points together. Any carry pulse from this second half-adder which is obtained from the core 8 sets the core 10 by which it is propagated to the next digit period before application to input point *it*2'. Where the adder of FIG. 8 requires the same pulse to be fed to windings of more than one core (for instance a pulse at terminal *it*2 has to be fed to the input windings of cores 2 and 3 and to the inhibiting winding of core 1) these windings have been shown connected in parallel in order to make the logical operation of the adder more readily apparent. It will be appreciated, however, that in practice it would usually be preferable for such simultaneously fed windings to be connected in series.

Turning now to the combining unit CU, the function of this unit is to effect, in dependence on the sign digit received on lead *sg*, algebraic addition of the digital position number and digital position correction as serially received on leads *pn* and *rc* respectively. For this purpose the combining unit CU may comprise, as illustrated in FIG. 5, an add/subtract control circuit ASC, followed by an adder ACU which can again be of the form illustrated in FIG. 4. It will be assumed that a "0" sign digit calls for addition and a "1" sign digit for subtraction. For addition, the digital information appearing on lead *rc* is passed through the add/subtract control circuit ASC, without inversion, to one input *it*1 of the adder ACU: that is, a digit pulse appearing on lead *rc* results in a digit pulse being applied to terminal *it*1, whereas a digit space (not pulse) appearing on lead *rc* results in a digit space appearing at terminal *it*1. For subtraction, the digital information on lead *rc* is inverted in the circuit ASC before application to the adder ACU, that is, a digit pulse on lead *rc* results in a digit space appearing at terminal *it*1, while a digit space on lead *rc* results in a digit pulse at terminal *it*1. While this does not give a true arithmetic subtraction, a true result can be obtained by injecting into the adder ACU a pulse corresponding in digital significance to the least significant digit of the position information. Using an adder such as that of FIG. 4 for instance, this can be done by applying an appropriately timed pulse to lead *su*.

Whether or not inversion is effected is determined by the sign digit. If the sign digit is a "1" calling for subtraction, the appearance of a pulse representing it on lead *sg* sets a core 15 and the next *q* pulse resets this core to produce an output pulse. This output pulse sets a core 16, which on the next *r* pulse feeds a pulse to the input winding of core 15. This core therefore again produces an output pulse on the next *q* pulse, which is now in the next digit period. A pulse circulation is therefore set up via cores 15 and 16, output pulses being obtained from core 15 on successive digit periods. These pulses are applied to the input winding of a core 11. If the sign digit is a "0", calling for addition, no pulses are applied to core 11 in this way until at an appropriate later time the pulse circulation is stopped by an inhibiting pulse applied over lead *s* to the inhibiting winding *h* of core 16: this pulse is timed to coincide with a *q* pulse so that the inhibiting condition coincides with the application of a pulse to the input winding of core 16 from the output winding or core 15.

The achieve subtraction, pulses coincide with successive digit periods are applied to the input winding *i* of a ferrite core 11, while pulses corresponding to "1" digits on lead *rc* are applied to the input winding of a core 12. If no pulse is received on lead *rc* in any particular digit period, only core 11 will become set and the next pulse appearing on lead *q* will produce from the output winding of this core a pulse which sets a further core 13. Consequently on the next pulse appearing on lead *r* the output winding of core 13 will apply a pulse to terminal *it*1 of adder ACU. If, on the other hand, a pulse appears on lead *rc* in a particular digit period, then cores 11 and 12 will both become set. On the next *q* pulse these cores 11 and 12 will produce respective output pulses which attempt to set cores 13 and 14 respectively, but they are inhibited from doing so by the inhibiting windings *h* on these cores. Consequently on the next *r* pulse neither of cores 13 and 14 can produce an output pulse and therefore no pulse is applied to terminal *it*. When addition is called for, no pulses are applied to the input winding of core 11. An input pulse on lead *rc* therefore results in the setting of core 12, followed by the setting of core 14 which is now not inhibited. Resetting of this core 14 by the next *r* pulse, therefore applies a pulse to terminal *it*1. There is therefore no digit inversion in this instance.

It will be noted that the processing of the correction digits in circuit ASC imposes on them an effective delay of one digit period, assuming that in accordance with FIG. 4 the input cores of the adder ACU are driven by the *p* shift pulses. The digital output from circuit ASC has therefore been delayed by the amount previously shown to be necessary to give time coincidence with the digits of like significance in the positional information on lead *pn*. Consequently they can both be applied directly to the adder ACU, from which will be obtained, on lead *od*, a serial representation of the required corrected position number.

The foregoing description has assumed that there is a delay of one digit period in each of the adders A1–A6 in the multiplier M. It may, however, be sometimes desirable to use a form of adder which acts with a somewhat longer delay than this. For instance in the adder circuit of FIG. 4, instead of using a transistor circuit for shaping the output pulse as described, it may be desirable to employ an additional core serving the same purpose as the core 9. However, as this core would have to be reset to produce the output pulse by a pulse occurring at one of the leads *p*, *q* and *r* in the next digit period, the use of such core would be seen to introduce a further delay of at least one-third of a digit period. This additional delay would have to be catered for in the design of the multiplier M by the provision of appropriate additional delays between the multiplier input lead *cf* on the one hand and the adders A1–A6 and the delay circuit DL15 on the other hand.

Thus if the delay in each amplifier corresponded to one-and-a-third digit periods as mentioned above, additional delays of ⅓ of a digit period each would be provided at the points X. Furthermore the shift pulses for the successive adders would have to be in different time phases. For instance if adder A6 was driven by a sequence of four successive shift pulses $p, q, r, p$, adder A5 would be driven by a sequence $q, r, p, q$, A4 by a sequence $r, p, q, r$, and so on. Likewise the particular shift pulses used for the add/subtract control circuit ASC and the adder ACU would have to be appropriately chosen, as may also have to be the delays imposed on the digital information on leads $rc$ and $pn$ prior to their application to the final adder.

What I claim is:

1. A digital computing arrangement for providing, from a recorded binary digital number, a digital output representing that number modified in accordance with the product of a given numerical quantity and a variable modification factor an instantaneous value of which is digitally recorded in binary form along with the digital number, which arrangement comprises:

a first input lead for receiving the modification factor digits as a first serial digit group;

a second input lead for receiving the digital number or digits as a second serial digit group following in time said first group, the least significant digit being first in each of said groups;

a plurality of binary switching devices respectively operable according to the digit values of said numerical quantity in binary form;

a plurality of digital addition circuits acting with a delay of at least one digit period each and having respective first input connections connected to said first input lead through respective ones of said switching devices except that of greatest digital significance;

said addition circuits also having respective second input connections and respective output connections of which, considering the addition circuits in order of decreasing digital significance of the switching devices with which their first input connections are associated, the output connection of each addition circuit except the last is connected to the second input connection of the next;

a delay element connected through the switching device of greatest digital significance between the first input lead and the second input connection of the first addition circuit in said order;

a first output lead connected to the output connection of the last addition circuit in said order;

and a combining circuit connected to receive digital inputs from said second input lead and from said output lead respectively, and to algebraically add said inputs with time coincidence of digits of like significance, said combining circuit having a final output lead on which will appear a series of digits representing the required modified value of the original digital number.

2. A digital computing arrangement as claimed in claim 1 arranged to receive the most significant digit of the modification factor digit group at a time immediately preceding the least significant digit of the digit group of the digital number to be modified, wherein said delay element and each of said addition circuits introduces a delay of one digit period and said arrangement includes means imposing a delay of one digit period on the digital input received by the combining circuit from said first output lead, whereby to bring said input into time coincidence of digit significance with respect to the digital input from the second input lead.

3. A digital computing arrangement as claimed in claim 1 wherein each of said addition circuits introduces a delay fractionally more than one digit period and said arrangement includes additional delays of appropriate magnitude between said first input lead and the addition circuits.

4. A digital computing arrangement as claimed in claim 1 wherein the combining circuit is arranged to receive a sign digit recorded along with the modification factor and includes add/subtract control circuit means for inverting the digital information received from said first output lead in response to said sign digit calling for modification of the digital number by subtraction, a further addition circuit for adding the digital information from said control circuit to that received from the second input lead and means for injecting into said further addition circuit a pulse corresponding in digital significance to the least significant digit of the digital information on said second input lead.

References Cited in the file of this patent

UNITED STATES PATENTS

| | | |
|---|---|---|
| 2,685,407 | Robinson | Aug. 3, 1954 |
| 2,960,268 | Chope et al. | Nov. 16, 1960 |